March 9, 1954 F. G. BOUCHER 2,671,375
SEISMOGRAM TRACE ANALYZER
Filed Dec. 12, 1950
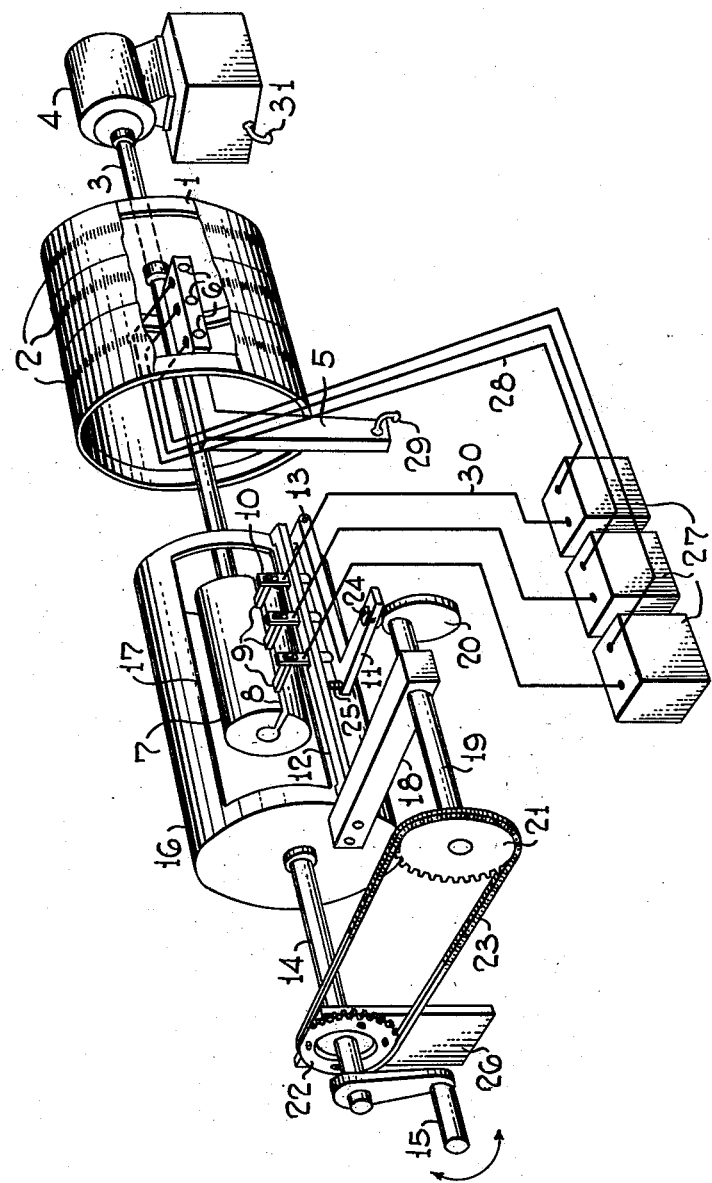
Frank G. Boucher Inventor
By W. O. J. Heilman Attorney Patented Mar. 9, 1954

2,671,375

UNITED STATES PATENT OFFICE 2,671,375

SEISMOGRAM TRACE ANALYZER

Frank G. Boucher, Tulsa, Okla., assignor to Standard Oil Development Company, a corporation of Delaware Application December 12, 1950, Serial No. 200,479

8 Claims. (Cl. 88—14)

This invention concerns novel apparatus for visually inspecting seismograph records obtained according to conventional seismic prospecting methods. In accordance with this invention, apparatus is provided of a nature to permit the selective illumination of particular portions of a plurality of seismogram traces. The apparatus includes means to vary the illumination of each of the traces so as to apply certain essential corrections. The apparatus is of a character to permit illumination and visual inspection of an apparent section of the earth, showing the reflecting horizon.

In seismic prospecting, seismic energy is initiated at or adjacent the surface of the earth, by means of an explosion, for example. The explosion causes production of elastic waves which are transmitted through the earth. At least a portion of these waves are directed downwardly through the earth and are reflected from different strata of the earth due to any discontinuities or variations of structure. By placing geophones or seismic pick-ups on or adjacent the surface of the earth at points displaced from the origin of the seismic energy, the arrival of the reflected waves at the earth's surface may be detected. The geophones convert the detected waves into electrical impulses which are then amplified and recorded by means of a seismograph. The seismograph record, also called a seismogram, consists of a plurality of traces arranged in parallel relation, each representative of the output from an individual geophone. The record is provided with suitable timing marks so that when the seismogram is later examined the time required for seismic energy to travel downwardly through the earth and to be reflected back to the geophones may be determined. This general method of seismic prospecting permits the determination of valuable geological information, particularly useful, for example, in the exploration for oil.

A long standing difficulty in employing seismic prospecting methods is that of analyzing the seismic records obtained. The records are of such a nature, due to the complexity of elastic waves set up and transmitted in the earth, and due to the multiplicity of reflecting barriers within the earth, etc., that visual interpretation of seismic records is extremely difficult. The present invention is directed to an apparatus to facilitate the visual interpretation of seismic records. Such an apparatus may be referred to as a seismogram trace analyzer.

While the apparatus of this invention has several specific objectives, two are of particular interest. First it is desired to provide a means for examining seismograph records which will automatically take into account the transmission of the seismic energy through the so-called low velocity layer of the earth. The low velocity layer of the earth is the upper portion of the earth extending for a depth up to about 50 or 100 feet, which is of a relatively unconsolidated nature, causing seismic energy to travel at a relatively low velocity. Consequently, in timing transmission of seismic energy downwardly to a reflecting barrier and back to the surface of the earth, corrections must be applied for the time required for the energy to penetrate the low velocity layer. The apparatus of this invention facilitates and simplifies application of this correction.

A second specific objective is to provide means for readily correcting for what may be said to be the "spread" of the geophones or seismic pick-ups employed. Thus, it is general practice to employ a group or an array of geophones to determine the reflection of seismic energy from strata of the earth. These geophones may be arranged in a great number of different patterns, but are generally arranged so that they will be at different distances along a line pointed toward the source of seismic energy. Consequently, a given seismic impulse reflected from a particular stratum of the earth will arrive at the different geophones at different periods of time. This is further complicated by the fact that the differing arrival times will also vary in accordance with the depth of the reflecting horizon. It is consequently important to be able to readily make corrections that will account for the differences in arrival time due to the differing placements of the geophones. In other words, it is valuable to provide means for simply correcting for the "spread" of these geophones. As is well known, the spread correction makes allowance for the added travel time along each slant ray path from the shot point to the reflecting subsurface layer and back to each succeeding geophone.

These and other objectives are satisfied by the apparatus of this invention, which enables a person viewing a seismic record to pick out reflecting horizons easily and rapidly and to obtain a visual picture of the attitude of the reflecting horizons, such as dip, curvature and the like. In other words, the apparatus of this invention enables one to convert the seismic records into a visual picture of the geologic cross-section of the area represented by the seismic record.

The apparatus provided is equipped with a cylindrical hollow drum driven by a suitable motor so as to revolve at a desired speed. Seismograph traces are placed around the drum in parallel strips corresponding to the number of traces to be simultaneously compared, and are so arranged as to align them with respect to the instant of initiation of the seismic shock. A number of light sources are positioned adjacent the drum so that each of the light sources is adapted to illuminate one of the seismograph traces arranged on the drum. Means are then provided to cause the light sources to periodically flash on and off in a manner so that each light flashes on momentarily for each revolution of the drum. By including means to vary the particular instant of flashing with respect to the rotational position of the drum, it is possible to readily provide a correction for transmission of seismic energy through the low velocity layer. Again by providing means of a variable nature to control the portion of the drum periodically illuminated, it is possible to scan different portions of the traces comparatively and to apply the desired spread correction, which of course changes with time along the record. The apparatus by which these requirements are satisfied is illustrated in the accompanying drawing, showing a preferred embodiment of this invention.

The drawing diagrammatically illustrates in perspective an integral apparatus embodying the features of this invention.

Referring to the drawing, the numeral 1 identifies a hollow cylindrical drum on which the seismic records 2 are positioned. Individual traces constituting the recorded signals from individual geophones are fixed about the drum 1. Preferably the point of each of the traces corresponding to the initiation of the seismic energy is arranged along a line on the surface of the drum parallel to the axis of the drum. In a conventional seismograph record the traces representing the signals from the individual geophones as the result of a particular seismic shot are ordinarily arranged in the desired side-by-side relation mentioned. It is particularly contemplated that seismic records of the photographic type, of the variable density or variable area nature, be employed. In this case, the drum 1 is constructed of transparent material such as glass or transparent plastic to permit light to pass through the drum and through each of the traces. It is this specific embodiment of the invention which is illustrated.

The drum 1 is fixed on a shaft 3 driven by a motor 4. As will be understood, the rotational speed at which the motor and drum are operated is not particularly critical, but may be about 800 to 1000 revolutions per minute. Adjacent the hollow transparent drum 1 is a bracket arrangement 5 having an arm extending within the drum parallel to shaft 3 supporting a number of light sources 6. The number of light sources will correspond to the number of seismic traces arranged on the drum, and the position of the light sources will be on lines perpendicular to the axis of the drum through each individual seismic trace. By this arrangement each of the light sources 6 is adapted to throw light directly outwardly through the drum and through one of the traces appearing on the seismic record or records.

In accordance with this invention, means are provided to cause operation of the light sources in a momentary fashion so as to periodically illuminate the traces. More precisely, the light sources are caused to flash once for each revolution of the drum so as to illuminate only one narrow portion of each of the traces of the seismogram. This is accomplished by providing an electrical circuit, controlling operation of the light sources through brushes arranged to contact a conductive segment of an insulated drum supported by the shaft on which the drum 1 is rotated. Thus, shaft 3 may be extended beyond drum 1 to provide support for a second drum 7. Drum 7 is constructed of a non-conducting, insulating material such as a plastic. The drum is longitudinally slotted so as to permit placement of a thin wafer of an electrically conductive material 8 maintained in contact with the supporting shaft 3. The slotted drum 7 and the conductive material 8 are prepared to present an unbroken cylindrical surface. Adjacent the drum 7 are positioned a plurality of contact brushes 9 positioned and supported to maintain sliding contact with the drum 7 as the drum rotates.

As will be described, each of the brushes 9 is electrically connected in a circuit with each of the light sources 6. The circuit is such that contact of an individual brush 9 with the electrically conductive material 8 of drum 7 causes an electrical circuit to be completed through a particular light source. Consequently, the arrangement causes each of the lights to momentarily flash as drums 1 and 7 revolve.

The brushes 9 are maintained in a desired position by the supporting arrangement illustrated. Slotted brush holders 10 are provided of a nature to permit the brushes to be moved upwardly or downwardly in the slots provided. Simple screws may be employed to hold each brush in a desired position within the slot of the brush holder. Each of the brush holders 10 is pivotally fixed to a supporting arm or bracket 11. The pivoting arrangement permits each brush holder to rotate to right or left in the drawing. To maintain the brush holders in a plane substantially perpendicular to the axis of drum 7, a slotted guiding member 12 is provided through which each brush holder passes in sliding relationship. This construction is such that on movement upwardly or downwardly of the arm or bracket 11 about its pivotal support 13, the brushes will be moved upwardly or downwardly with respect to pivot point 13, the brushes moving through a greater distance the further they are from pivot point 13. As will be seen, this construction permits application of the desired spread and low velocity corrections in employing the apparatus. The direct analogy between imparting a mechanical correction here for differences in wave travel time due to differences in elevation for each geophone with respect to a selected datum, a correction for weathered layer velocity, spread correction and the like, and a similar mathematical correction when computing seismic records in the conventional manner will be readily apparent to those skilled in the art of seismic prospecting.

The brush holding arrangement described, including the slotted guide 12 and the pivoted bracket 11 is suitably supported by rotatable shaft 14 controlled by handcrank 15. This may be accomplished as illustrated by mounting the brush holding arrangement on a hollow drum 16 having a cutaway portion 17. The hollow drum 16 is fixed to shaft 14 so as to rotate upon turning handcrank 15. Consequently, as handcrank 15 is turned, the brushes will be moved circumferentially about the cylinder 7.

As an additional requirement, supporting arm 18 is fixed to drum 16. Supporting arm 18 provides a bearing for a shaft 19 carrying cam 20 at one end thereof and gear 21 at the other end thereof. Gear 21 is arranged to rotate as handcrank 15 and shaft 14 are turned. This may be accomplished, for example, by fastening a gear 22 to bracket 26 and coupling gear 22 to gear 21 by means of chain drive 23. Since gear 22 is securely fastened to bracket 26, and shaft 14 is rotatably held by bracket 26, it can be seen that as drum 16 is rotated and member 12, arm 18 and shaft 19 revolve about shaft 14, gear 21 will rotate shaft 19 with respect to arm 18. Cam 20, turned by shaft 19, is arranged to contact the pivoted bracket 11 on which the brush holders are pivotally mounted. Wear may be reduced by positioning a small contact wheel or cam follower 24 on bracket 11 for contact with cam 20. Cam follower 24 is urged against cam 20 by means of spring 25 acting against slotted guide 12.

Drum 16 supporting the brush supports described is maintained in coaxial alignment with drum 7 by a suitable support 26 through which shaft 14 may pass. As already explained, as handcrank 15 is turned, drum 16 will rotate, and because of the arrangement of gears 21 and 22 and chain 23, shaft 19 will rotate relative to arm 18. Gears 21 and 22 should be of the same diameter so that cam 20 will make one revolution for each revolution of crank 15.

Finally, it should be observed that suitable electrical power sources such as batteries 27 are electrically connected to each of the light sources 6 and to each of the brushes 9. To trace the electrical circuit to a particular light source, electricity may be considered to flow from a battery 27 directly to a light source 6 through a line 28. The circuit is completed through light source 6 by grounding the light source to conductive supporting arm 5 as by means of ground 29. The remainder of the circuit is completed from the other side of a battery 27, through a conductor 30, a brush 9, conductive wafer 8 and shaft 3, by grounding the shaft 3 as by means of ground 31 associated with motor 4. It is understood of course that conductors 30 are shown schematically rather than physically in the drawing, in order to simplify the description and that actually a slip ring or commutator arrangement would be required to permit rotation of drum 16. Conveniently this arrangement could be positioned about shaft 14 to the immediate left of drum 16 in the drawing, the conductors to the various brushes being dressed along member 12, since the general position of the brushes and of member 12 is always the same relative to the position of drum 16.

It will be apparent that as transparent drum 1 is rotated by motor 4, each of the light sources 6 will be caused to momentarily flash once for each revolution of drum 1 by virtue of the electric circuit provided. Consequently, on viewing drum 1 in a darkened room, a particular portion of each of the seismogram traces will momentarily be illuminated repeatedly on each rotation of the drum. The effect will appear stroboscopic. In order to correct for displacements of corresponding signals on the different seismogram traces due to necessary low velocity layer and spread corrections, brushes 9 will be adjusted in the slotted holders 10, as already mentioned. This will cause an apparent displacement of the traces with respect to each other and the result will be a view of an apparent section with the low velocity and spread corrections taken into account. Conveniently the brushes may be provided with graduations corresponding to the time lines on the seismic record so that the brushes may be moved up or down in the brush holders to change the position of these graduations relative to a reference point on the brush holders, the distance of this movement being equal to the elevation, low velocity layer and spread corrections that would be normally applied to the records during the computing thereof by means well known to persons skilled in the art of seismic prospecting.

In order to view different portions of each of the seismogram traces, handcrank 15 may be turned to cause the illumination of a different portion of each of the seismogram traces. In addition, turning of the handcrank 15 will cause rotation of cam 20 with the consequent pivoting of arm 11, causing relative changes in the instant at which each of the brushes 9 contacts the conductive portion of drum 7. By suitably cutting cam 20 this action may be caused to automatically change the spread correction with elapsed time on the record, so that the proper portion of each of the seismograph traces will be illuminated.

As is well known, while the corrections other than spread correction that are usually made when computing seismic records will be constant for each individual trace throughout its length the spread correction changes with time along the record because of the difference in travel angle to the deeper subsurface strata whose reflections are picked up later on the record. Thus as different portions of the record are viewed, these portions representing different amounts of elapsed time from the beginning of the record, the arrangement shown will automatically shift the spread correction to compensate for travel time differences. Briefly stated, the spread correction for travel time to the last geophone in a geophone array as compared to the spread correction for the travel time to the first geophone in the array will be less for a deeper reflecting bed than for a relatively shallow reflecting bed. In other words, more spread correction is necessary for the earlier part of the record which shows reflected waves received from shallow beds than for the latter part of the record which will naturally show reflected waves from deeper beds which have taken longer to arrive back at the geophones. Hence the seismic record will be so arranged on the drum 2 that the flashing light that illuminates the trace from the geophone nearest the shot point will be controlled by the brush 9 that is closest to the pivot point 13, and the light that illuminates the trace from the geophone farthest from the shot point will be controlled by the brush farthest from pivot point 13.

While the invention has been described with regard to an apparatus for viewing transparent seismogram traces, the apparatus may readily be employed for viewing opaque non-transparent seismogram traces. For this purpose the bracket supporting the light sources is positioned outside rather than within drum 1. This makes possible viewing the seismograms by reflected rather than by transmitted light. In all other respects the apparatus and operation of the apparatus is identical to that described.

What is claimed is:

1. Apparatus for visually inspecting and comparing a plurality of traces arranged longitudinally in parallel relation on a record medium comprising, in combination, a cylindrical record supporting drum adapted for mounting said record medium circumferentially thereon, means for rotating said drum, a plurality of light sources arranged adjacent said drum in a manner providing a separate light source to illuminate each individual trace, means to activate each light source momentarily once for each rotation of said drum, all of said light sources being activated during essentially the same general circumferential positioning of the drum for a given rotation of the drum, and means to select the general circumferential portion of the drum thus illuminated in a given rotation of the drum.

2. Apparatus as defined by claim 1 including means to adjust the instant of activation of each light source relative to the remaining light sources during a rotation of the said drum.

3. Apparatus as defined by claim 1 in which said means to activate each light source comprises an electrical circuit connected to said light source, said circuit including a contact brush, a non-conductive cylindrical member rotated by said means for rotating said drum, said cylindrical member being rotated once for each rotation of said drum, said cylindrical member having an elongated slot, a conductive insert in said slot, electrical circuit connections providing an electrical circuit to the light source through said contact brush and said conductive insert, and support means for holding the plurality of brushes associated with the plurality of light sources in contact with said cylindrical member along said conductive insert, whereby the electrical circuit for each light source is momentarily closed once for each complete rotation of said cylindrical member, said means to select the general circumferential portion of the said record supporting drum that is illuminated during each rotation of the drum comprising means for moving said brush support means circumferentially about said cylindrical member in relation to said conductive insert.

4. Apparatus as defined by claim 3 including means for adjusting the position of said brushes relative to each other circumferentially of said cylinder whereby to adjust the instant of activation of each light source relative to the remaining light sources during a rotation of the said drum.

5. A seismogram trace analyzer comprising, in combination, a supporting shaft, means for rotating said shaft, a record support drum fixed to said shaft and adapted for supporting thereon a plurality of seismogram traces arranged longitudinally in parallel relation, a plurality of light sources arranged adjacent said drum in a manner providing a separate light source to illuminate each individual seismogram trace, a non-conductive cylinder fixed to said shaft for rotation thereby, said cylinder having a longitudinally arranged slot therein, a wafer of conductive material inserted in said slot, a brush support arranged adjacent said non-conductive cylinder, a plurality of brushes held by said brush support in slidable contact with said cylinder and arranged in a longitudinal line along said cylinder, means for moving said brush support circumferentially about said cylinder, and electrical circuit means for each of said light sources, each of said circuit means including a source of electrical power, one of said brushes, said conductive insert and one of said light sources connected in series.

6. Analyzer as defined by claim 5 including means for adjusting each of said brushes with relation to said support whereby to select the instant of contact of each brush with said conductive wafer relative to the remaining brushes during a rotation of said cylinder.

7. Analyzer as defined by claim 5 in which said means for moving said brush support circumferentially about said cylinder comprises a second rotatable shaft arranged substantially in coaxial alignment with said first named shaft, said brush support comprising a supporting arm held by said second shaft in parallel relation to said cylinder.

8. Analyzer as defined by claim 5 including a second rotatable shaft arranged substantially in coaxial alignment with said first named shaft, a brush supporting arm held by said second shaft in parallel relation to said non-conductive cylinder, a plurality of brush holders held non-rigidly by said supporting arm for vertical slidable movement relative thereto, each of said brushes being held by one of said brush holders whereby to contact said cylinder, a movable arm pivotally supported at one end to said supporting arm and engaging the lower ends of said brush holders, a cam supported by said second shaft and engaging the free end of said movable arm, means for rotating said second shaft and means for rotating said cam in relation to the rotation of said second shaft, whereby on rotation of said second shaft to move said brush supporting arm circumferentially about said cylinder, said movable arm will vary the longitudinal alignment of said brushes.

FRANK G. BOUCHER.

References Cited in the file of this patent

UNITED STATES PATENTS

| Number | Name | Date |
|---|---|---|
| 2,296,777 | Elton | Sept. 22, 1942 |
| 2,346,251 | Bryce | Apr. 11, 1944 |
| 2,355,465 | Oberkirk | Aug. 8, 1944 |
| 2,427,421 | Rieber | Sept. 16, 1947 |
| 2,440,797 | Clough | May 4, 1948 |
| 2,510,093 | Ferguson | June 6, 1950 |